United States Patent [19]
Sundberg et al.

[11] 3,721,973
[45] March 20, 1973

[54] SPEED MONITORING APPARATUS
[75] Inventors: Garald C. Sundberg, Huron, S. Dak.; Eugene T. Swenson, Minneapolis, Minn.
[73] Assignee: Honeywell Inc., Minneapolis, Minn.
[22] Filed: Dec. 15, 1969
[21] Appl. No.: 885,032

[52] U.S. Cl..................................340/263, 318/184
[51] Int. Cl................................................G08b 21/00
[58] Field of Search.........340/263, 267, 248 H, 268; 318/184

[56] References Cited

UNITED STATES PATENTS

| 3,549,948 | 12/1970 | Jaeschke | 340/268 X |
| 3,334,342 | 8/1967 | Blackman | 340/263 |
| 3,378,744 | 4/1968 | Seney | 340/267 |

Primary Examiner—John W. Caldwell
Assistant Examiner—Michael Slobasky
Attorney—Charles J. Ungemach and Gordon Reed

[57] ABSTRACT

The arrangement provides a novel method of selectively monitoring the hunt frequency of the synchronous spin motors of several gyros to determine the proper operation of the selected gyro. Two signals are used from each gyro for such monitoring action: (1) the phased winding voltage, and (2) the spin motor excitation voltage, of the split phase or two phase motor that drives the gyro rotor. Summing of the phased winding voltage and the excitation voltage for the line winding produces an amplitude modulated carrier wave, modulated proportional to the hunt phase shift of the rotor. The resultant modulation envelope is detected, filtered, band pass amplified and thereafter converted to a threshold logic voltage for an indication that the gyro spin motors are at synchronous speed.

7 Claims, 1 Drawing Figure

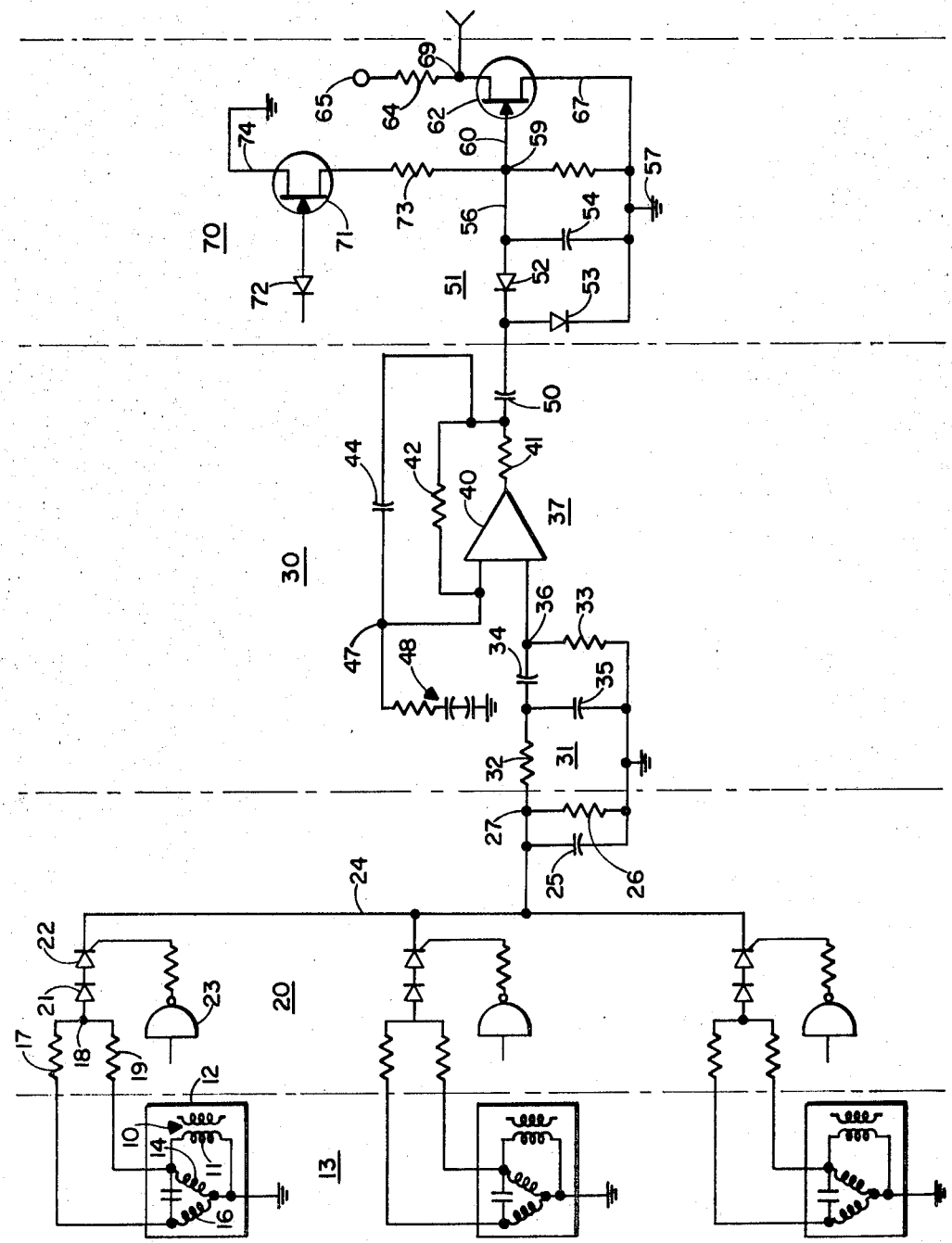

SPEED MONITORING APPARATUS

BRIEF SUMMARY OF THE INVENTION

Variations in speed of the rotor of a synchronous motor such as a gyro spinmotor about the synchronous speed of the rotating magnetic field of the motor occur during proper motor operation. These speed variations, commonly called "hunting," cause a phase modulation of the voltage of the reactively coupled spin motor winding. This low frequency "hunt" variation of the rotor speed affects the current requirements of the tuned motor winding. Since the phased winding has some capacitive impedance between it and the power supply, the phased winding may serve as a sensor winding for the hunting phenomenon. Thus for an indication that the gyro spin motors are at synchronous speed, and therefore, incurring a hunt, two signals are utilized; the motor phased winding voltage, and a reference voltage in phase with the gyro spin motor supply and thus in phase with the motor line winding voltage. The hunting phenomenon of the instantaneous actual spin motor position relative to the position at synchronous speed for the motor appears as a phase modulation of the voltage applied to the reactively coupled winding of the motor. In order to determine if the motor is operating about synchronous speed, the low frequency hunt component, that causes the phase modulation of the reactively coupled winding voltage is separated from the motor excitation frequency or voltage of the line winding.

This separation is effected by summing the phased winding voltage and the line winding voltage which produces an amplitude modulated carrier wave, modulated proportional to the hunt phase shift of the reactively coupled winding. Thereafter, the resultant modulation envelope is detected, filtered, supplied to a band pass amplifier and converted thereafter to a threshold logic voltage for an indication that the gyro spin motors are at synchronous speed.

The rotor hunting may be initiated by perturbations of the gyro spin motor speed due for example, to change in bearing striction. The rotor hunting oscillations decrease in amplitude with time, as a damped wave train. They are randomly regenerated with each mechanically caused perturbation of the gyro, such as tilting the gyro about an input axis.

BRIEF DESCRIPTION OF THE DRAWING

The sole FIGURE of the drawing illustrates in electrical schematic form a spin motor run detector to selectively monitor the hunt frequency of spin motors for three gyros.

DETAILED DESCRIPTION

Referring to the drawing, the monitoring system may be considered, moving from left to right in the figure, as comprising a gyro spin motor section, a phase relation detector, a filter and spin motor rotation detector (SMRD) amplifier and a logic circuit. While spin motor windings are shown for three gyroscopes, only the windings of one spin motor will be described, since the other two are substantially identical with it. In the upper left of the figure, gyroscope number 1 includes a transformer 10 having a primary winding 12 and a secondary winding 11. The secondary winding 11 energizes two windings of a split phase motor, a line winding, 14, and a phased winding 16, the winding 16 being termed a phased winding since the phase of its signal is distinct from that of the line winding, the phase shift being created by a capacitor connected between the windings, as shown in the figure. Since variation in speed of the rotor or "hunting" produces a low frequency angular displacement as well as low frequency current variations, summing provides a simple and novel way to obtain the basic SMRD signal. To achieve summing, the voltage across the line winding 14 is transmitted through resistor 17 of the phase detector to summing point 18 and the voltage across the phased winding 16 is transmitted through resistor 19 of the phase detector to summing point 18 whereby a modulation wave resulting from the summation of the line winding and phased winding voltages is obtained.

The amplitude modulated voltage at summing point 18 is transmitted through a diode 21 to a silicon controlled rectifier 22, hereinafter designated as SCR 22. The SCR 22 provides half wave rectification and may be selectively "turned on" fully by a suitable switching arrangement 23 of the phase detector that applies a plus (+) voltage to the gate electrode of SCR 22. It is evident that selective multiple monitoring of three gyroscopes employing but one amplifier is provided by the several SCR's whose selective monitoring is sequenced directly through switching means corresponding to switching means 23 of gyroscope number 1. If but one gyro motor speed is to be checked, rather than a plurality, selectively the SCR 22 may be replaced by a diode for demodulation purposes.

Associated with SCR 22, through a conductor 24 which transmits the half wave rectified, amplitude modulated voltage from SCR 22, are a capacitor 25 and a resistor 26 connected in parallel to signal ground. Capacitor 25 and resistor 26 form the remaining elements of the phase detector. Capacitor 25 and resistor 26 as connected are in the SCR cathode circuit. When SCR 22 is on, it acts as a half wave rectifier or as an envelope detector for the amplitude modulated wave it receives. Thereafter, the 400 cycle carrier is filtered by capacitor 25, which acts as a low impedance to the 400 cycle signal applied to the motor line winding 14 and separates the hunt frequency from the motor excitation frequency. Capacitor 25 and resistor 26 form what may be considered a "trap" to the low frequency speed variations or hunt component of the motor. In other words, while the excitation frequency for the motor is filtered through capacitor 25 to ground, the hunt frequency component sees the capacitor as a higher impedance and is transmitted to the hunt filter and amplifier section to be described.

An RC filter network 31 receives the output from the phase detector and supplies its output to an amplifier section 37. The filter 31 is arranged to provide amplifier section 37 with a high pass input signal, filtered so as to complement the amplifier band pass. In other words, the amplifier band pass output is attenuated on either side of the nominal three cps hunt frequency, any steady state DC error or bias signal is also removed. The filter network 31 comprises resistors 32 and 33 and capacitors 34 and 35. The resistor 32 and capacitor 35 are connected in electrical series between the output of the phase detector and ground. Capacitor 34 and resistor 33 are connected in electrical series between the junction of resistor 32 and capacitor 35 and ground. A junction 36 of capacitor 34 and resistor 33 acts as an input terminal to an operational amplifier 40.

Amplifier 40 has an inverting input terminal and a non-inverting input terminal. The output from the amplifier 40 is connected in feedback relation through resistors 41, 42 to the non-inverting input.

The output of amplifier section 37 is supplied through coupling capacitor 50 to a voltage doubler 51. Voltage doubler 51 comprises diodes 52, 53, and capacitor 54 with the doubled voltage appearing between conductor 56 and ground 57. This output voltage is D. C.

The output from doubler 51 is transmitted through conductor 56 to a terminal 59. From terminal 59 extends a conductor 60 to a gating element of a field effect transistor 62, hereinafter termed FET 62. FET 62 has its source connected through resistor 64 to terminal 65 of a + 15V DC source and its drain connected through conductor 67 to ground 57. The output from logic arrangement 51 appears at terminal 69, which terminal is located intermediate resistor 64 and the transistor source. Thus with a significant output from the doubler arrangement 51 to FET 62, the voltage from terminal 65 is gated to ground thru FET 62, and the output voltage at terminal 69 is substantially at ground. This indicates a "go" or satisfactory operation of the gyro spin motor under test.

Associated with the doubler arrangement 51 is a discharge arrangement 70 comprising a second FET 71. FET 71 has its gate connected through a diode 72 to a control voltage source. Transistor 71 has its source connected through resistor 73 to terminal 59 and its drain connected through conductor 74 to ground. Thus when desired, for example when the monitor is switched from gyro number 1 to gyro number 2, capacitor 54 may be discharged by gating FET 71.

Low frequency speed variations or hunting oscillations of the spin motor of a gyro are generated whenever a mechanically caused perturbation of the gyro occurs; the rotor hunting oscillations decrease in amplitude with time as a damped wave train. However, the oscillations are regenerated with each mechanically caused perturbation of the gyro. Such hunting is the normal and expected operation of the spin motor and therefore, monitoring whether or not hunting is present is one way of monitoring normal operation.

In summary, the above circuit provides a method and means of selectively monitoring the spin motor hunt frequency of several gyros. Two signals from each gyro are used: (1) the phased winding voltage and (2) the spin motor excitation voltage. The hunting of the spin motor about its nominal speed manifests itself as a phase modulation of the voltage of the reactively coupled winding of the spin motor. Comparison of voltage signals appearing at the high sides of the two spin motor windings will reveal a phase modulation between them, the phase modulated signal being the hunt signal sensed by applicants' invention. Separation of the hunting signal from the 400 cycle motor excitation frequency signal and detection of the hunting signal is then accomplished by the filter, amplifier, and logic circuits previously described.

What is claimed is:
1. A motor hunting operation detector for a split phase AC motor having a rotor, a line winding and a phased winding, comprising:
   first means for receiving a signal indicative of the phase of the line winding voltage;
   second means for receiving a signal indicative of the phase of the phased winding voltage;
   summing means operably connected to said first and second means for summing the phase indicative signals from said first and second means, thereby producing an amplitude modulated carrier wave of the line winding voltage frequency proportional to the hunt phase shift of the phased winding voltage, and a phase detector means receiving the amplitude modulated carrier wave and detecting and transmitting the envelope of the carrier wave.

2. The apparatus of claim 1, and a band pass filter for passing the hunting frequency of the motor connected to the detector and thereby transmitting primarily the hunt frequency of said modulation envelope.

3. The apparatus of claim 1, wherein the phase detector means comprises a silicon controlled rectifier (SCR) with a means for selectively turning it on, a filter for the carrier frequency voltage and a trap to prevent filtering of the hunt frequency voltage.

4. The apparatus of claim 2, a logic output arrangement, and means transmitting the output of the hunt frequency filter to the logic arrangement and providing an output therefrom for significant magnitudes of the hunt frequency.

5. The apparatus of claim 4 wherein the logic arrangement comprises a semi-conductor SCR which is gated to an on condition for significant hunting amplitudes of said spin motor.

6. The apparatus of claim 1 wherein the phased detector means comprises an SCR to provide multiple monitoring of a plurality of spin motors and which SCR also functions as the envelope detector of the amplitude modulated carrier wave.

7. A motor hunting operation detector for a split phase AC motor having a rotor, a line winding and a phased winding, comprising:
   first means for receiving a signal indicative of the phase of the line winding voltage, said first means being connected to receive the line winding voltage;
   second means for receiving a signal indicative of the phase of the phased winding voltage; and
   summing means operably connected to said first and second means for summing the phase indicative signal from said first and second means, thereby producing an amplitude modulated carrier wave of the line winding voltage frequency proportional to the hunt phase shift of the phased winding voltage.

* * * * *

UNITED STATES PATENT OFFICE
CERTIFICATE OF CORRECTION

Patent No. 3,721,973      Dated March 20, 1973

Inventor(s) Garald C. Sundberg, Eugene T. Swensen

It is certified that error appears in the above-identified patent and that said Letters Patent are hereby corrected as shown below:

Column 1, line 65, after "figure," insert -- a --;

same line, cancel "number 1" insert -- spin motor generally designated 13 --.

Column 2, line 12, cancel "17" insert -- 19 --;

line 14, cancel "19" insert -- 17 --;

lines 30 and 31, cancel "number 1" insert -- spin motor 13 --.

Column 3, line 8, after "input." insert -- In addition, the signal present at the junction of resistors 41 and 42 is connected through a capacitor 44 to the non-inverting input. Connected between capacitor 44 and the non-inverting input at a junction point 47 is a series resistor-capacitor combination 48. --;

line 37, cancel "gyro number 1" insert -- gyro spin motor 13 --;

same line, cancel "gyro number 2" insert -- one of the other spin motors, --.

Signed and sealed this 22nd day of January 1974.

(SEAL)
Attest:

EDWARD M. FLETCHER, JR.
Attesting Officer

RENE D. TEGTMEYER
Acting Commissioner of Patents